(12) United States Patent
Schmidt et al.

(10) Patent No.: US 7,452,418 B2
(45) Date of Patent: Nov. 18, 2008

(54) UNITIZED FILAMENTARY CONCRETE REINFORCEMENT HAVING CIRCUMFERENTIAL BINDING ELEMENT

(75) Inventors: Paul Schmidt, Pretty Praire, KS (US); Gene Lamb, Kingman, KS (US); David Anderson, Kingman, KS (US); Nick Carter, Mooresville, NC (US)

(73) Assignee: Polymer Group, Inc., Charlotte, NC (US)

( * ) Notice: Subject to any disclaimer, the term of this patent is extended or adjusted under 35 U.S.C. 154(b) by 339 days.

(21) Appl. No.: 11/369,050

(22) Filed: Mar. 6, 2006

(65) Prior Publication Data

US 2006/0147694 A1    Jul. 6, 2006

Related U.S. Application Data

(63) Continuation of application No. 10/856,613, filed on May 28, 2004, now abandoned.

(60) Provisional application No. 60/474,590, filed on May 30, 2003, provisional application No. 60/490,628, filed on Jul. 28, 2003.

(30) Foreign Application Priority Data

May 28, 2003   (DE)   ................. 103 24 238

(51) Int. Cl.
*C04B 16/06* (2006.01)
(52) U.S. Cl. ..................... 106/644; 106/713
(58) Field of Classification Search ................. 106/644, 106/713
See application file for complete search history.

(56) References Cited

U.S. PATENT DOCUMENTS

| | | |
|---|---|---|
| 3,273,978 A | 9/1966 | Paul |
| 3,301,252 A | 1/1967 | Mahoney, Jr. |
| 3,595,454 A | 7/1971 | Kalwaites |
| 3,625,809 A | 12/1971 | Caroselli et al. |
| 3,739,053 A | 6/1973 | Yazawa |
| 3,756,484 A | 9/1973 | Guenther |
| 3,813,098 A | 5/1974 | Fischer et al. |
| 3,846,085 A | 11/1974 | Dunn, Jr. |
| 3,978,648 A | 9/1976 | Yamagata et al. |
| 4,224,377 A * | 9/1980 | Moens |
| 4,228,641 A | 10/1980 | O'Neil |
| 4,299,884 A | 11/1981 | Payen |
| 4,314,853 A * | 2/1982 | Moens |
| 4,433,536 A | 2/1984 | O'Neil |
| 4,544,603 A | 10/1985 | Richards |
| 4,588,443 A | 5/1986 | Bache |
| 5,091,255 A | 2/1992 | Hsu et al. |
| 5,227,227 A | 7/1993 | Boulanger |
| 5,399,195 A | 3/1995 | Hansen et al. |
| 5,456,752 A | 10/1995 | Hogan |
| 5,628,822 A | 5/1997 | Hogan |
| 5,807,458 A * | 9/1998 | Sanders et al. |
| 5,897,928 A * | 4/1999 | Sanders et al. ........... 428/36.92 |
| 5,910,361 A | 6/1999 | Guevel et al. |
| 5,985,449 A | 11/1999 | Dill |
| 6,010,585 A | 1/2000 | Fujii et al. |
| 6,258,159 B1 | 7/2001 | Pyle |
| 6,423,134 B1 | 7/2002 | Trottier et al. |
| 6,569,525 B2 * | 5/2003 | Rieder et al. |
| 6,569,526 B2 * | 5/2003 | Rieder et al. |
| 6,758,897 B2 * | 7/2004 | Rieder et al. |
| 6,803,332 B2 | 10/2004 | Andrews |
| 7,045,209 B1 | 5/2006 | Selivansky |
| 7,067,002 B2 | 6/2006 | Schmidt et al. |
| 7,147,904 B1 | 12/2006 | Crawford |
| 7,219,478 B2 | 5/2007 | Schmidt et al. |
| 2003/0044592 A1 | 3/2003 | Perez et al. |
| 2004/0244653 A1 | 12/2004 | Schmidt et al. |
| 2005/0011161 A1 | 1/2005 | Schmidt et al. |
| 2005/0011417 A1 | 1/2005 | Schmidt et al. |
| 2005/0013981 A1 | 1/2005 | Schmidt et al. |
| 2006/0070341 A1 | 4/2006 | Schmidt et al. |
| 2006/0222836 A1 | 10/2006 | Schmidt et al. |

FOREIGN PATENT DOCUMENTS

WO       WO 03/045868 A1 *   6/2003

* cited by examiner

*Primary Examiner*—Paul Marcantoni
(74) *Attorney, Agent, or Firm*—Kilyk & Bowersox, PLLC; Valerie Calloway

(57) ABSTRACT

The present invention relates to a filamentary film construct which is used in providing cementitious mixtures supplemental and reinforcing strength upon setting, and more particularly, to a unitized filamentary construct which comprises a plurality of oriented reinforcing filamentary film components combined with a circumferential retaining element, said circumferential retaining element providing temporary retention of the oriented reinforcing filamentary components until such point the unitized filamentary substrate is incorporated and subjected to mechanical agitation during preparation of a cementitious blend or mixture. The unitized filamentary film construct is endowed with inherent and improved dispensability and dispersability of the associated reinforcing filamentary component into organic or inorganic cementitious matrixes, such as concrete, mortar, plaster, etc. The oriented reinforcing filamentary film components can comprise fibrillated film components.

20 Claims, No Drawings

UNITIZED FILAMENTARY CONCRETE REINFORCEMENT HAVING CIRCUMFERENTIAL BINDING ELEMENT

TECHNICAL BACKGROUND

This invention relates to a filamentary film construct which is used in providing cementitious mixtures supplemental and reinforcing strength upon setting, and more particularly, to a unitized filamentary construct which comprises a plurality of oriented reinforcing filamentary film components, which may comprise fibrillated film, combined with a circumferential retaining element, said circumferential retaining element providing temporary retention of the oriented reinforcing fibrous components until such point the unitized fibrous substrate is incorporated and subjected to mechanical agitation during preparation of a cementitious blend or mixture.

BACKGROUND OF THE INVENTION

Many proposals have been made to reinforce, strengthen, or otherwise beneficially alter the properties of cementitious mixtures by applying and/or incorporating various types of fibrous components, including asbestos, glass, steel, as well as synthetic polymer fibers to aqueous based concrete mixes prior to the curing of the concrete. The types of polymer fibers in use or proposed for use include those composed of natural and synthetic composition.

As is evident in the prior art, individual fibrous components are well known in terms of their performance modifying attributes. Relatively large diameter fibers, for example, in excess of 40 to 60 microns in diameter, can be added to a cementitious mixture such as a wet concrete blend, dispersed in the blend by mechanical agitation, followed by pouring and curing of the concrete. Large diameter fibers serve to reinforce the concrete after it has been cured, by providing additional tensile strength and minimizing impact damage and crack propagation. Small diameter fibers, typically less than 30 to 40 microns in diameter, and having a relatively high surface area, are commonly added to concrete mixes in order to reduce the development of small cracks in the concrete during the curing period. The problem of crack development is known to occur as a result of uneven curing of the concrete.

The fibrous components used typically in the practice of reinforcing cementitious mixtures include specifically thermoplastic synthetic fibers of finite staple length, such as polypropylene staple fibers. Thermoplastic staple fibers are produced by a well known and economical melt spinning process, in which molten polymer is extruded through a die having a plurality of small openings to produce a tow of continuous thermoplastic filaments of a controlled diameter. The filaments are cooled and drawn or elongated to increase tensile strength. A size or finish is usually applied to the filaments, followed by drying and cutting into the desired length to provide bundles of individual fibers. The use of polypropylene fibers is desirable for several reasons, including low raw material cost, beneficial physical properties such as malleability, and the non-reactive chemical properties of the polymer in the adverse environments frequently encountered in cementitious mixtures (i.e. strongly alkaline pH).

While the functional performance of the reinforcing fibrous components is beneficial, the means for the quantitative measurement, physical addition and homogenous distribution of the reinforcing fibrous components into a cementitious mixture is not without issue. Staple length fibers, as have been conventionally used, are provided in the same form as such are manufactured from the fiber formation line, which included agglomerates of various size and weight, tangles or knots of intermingled staple fibers, and numerous individual staple fibers that are in and of themselves prone to release randomly. Due to the variable and unpredictable form conventional reinforcing fibrous components have heretofore been provided for end-use consumption, such as at a construction work-site, the accurate and reproducible dosing of reinforcing fibrous component into sequential batches of cementitious mixtures has been dubious at best. Further complicating the actual utilization of the reinforcing fibrous components, numerous synthetic thermoplastic polymers used in the formation of suitable staple fibers are inherently hydrophobic in nature. As a result, difficulties can arise in obtaining a uniform dispersion and blending of the reinforcing fibrous component throughout hydrous cementitious mixtures using conventional mixing equipment.

Prior attempts to address the issue described have focused on the use of binding agents. U.S. Pat. No. 5,399,195, incorporated herein by reference, discloses the addition of small amounts of fine (less than 30 microns) polymer fibers to concrete. During production, the filaments are treated with a topical wetting agent. After the filaments are chopped into staple-length fibers, the wetting agent holds or binds the staple fibers together in the form of micro-bundles. The micro-bundles remain relatively stable during handling, and when the fibers are added to the concrete mix, the wetting agent promotes dispersion of the fibers. U.S. Pat. No. 6,258, 159, also incorporated herein by reference, attempts to address the forming of micro-bundles of fibers by incorporation of binding agents into the staple fibers themselves during the melt-extrusion process.

The use of binding agents, whether internal or externally applied, while improving in-part issues inherent of individual staple fibers, such practices have not obviated such problems as random agglomerate size, and further, the use of binding agents has introduced additional problems. Most notably, the corresponding performance of the binding agent is based upon application of the binding agent to the reinforcement fibrous components such that the binding agent is both uniformly applied to the majority of the fibers so as to obtain equivalency within the batch, and that no excess binding agent is introduced as such will adversely effect the ability of the reinforcement fibrous components to disengage and distribute homogeneously. One other determent encountered in the use of binding agents is that air is often entrained within the micro-bundles upon application and agglomeration of the staple fibers. When such micro-bundles are subjected to mechanical mixing, the entrained air is released as a foam, a foam that reasonably compromises the ability of the cementitious mixture to cure uniformly.

As is evident in the industry, an unmet need exists for a means of introducing reinforcing filamentary components into a cementitious mixture such that the reinforcing filamentary components exhibit the attributes of uniform and predictable presentation for use, ability to be homogenous distributed during mechanical agitation, and does not introduce an adverse chemical agent which can compromise the performance of the resulting cementitious matrix.

SUMMARY OF THE INVENTION

The present invention relates to a filamentary film construct which is used in providing cementitious mixtures supplemental and reinforcing strength upon setting, and more particularly, to a unitized filamentary construct which comprises a plurality of oriented reinforcing filamentary film components combined with a circumferential retaining element, said circumferential retaining element providing temporary retention of the oriented reinforcing filamentary components until such point the unitized filamentary substrate is incorporated and subjected to mechanical agitation during preparation of a cementitious blend or mixture. The unitized filamentary film construct is endowed with inherent and improved dispensability and dispersability of the associated reinforcing filamentary component into organic or inorganic cementitious matrixes, such as concrete, mortar, plaster, etc. The oriented reinforcing filamentary film components can comprise fibrillated film components.

In a first embodiment, the unitized filamentary film construct of the present invention is formed from two or more reinforcing filamentary film components of finite staple length and essentially parallel orientation and a circumferential retaining element. In a second embodiment, the unitized filamentary film construct of the present invention is formed from two or more reinforcing filamentary film components of infinite length and essentially parallel orientation and a circumferential retaining element. In a third embodiment, the unitized filamentary construct of the present invention is formed from two or more reinforcing filamentary film and fibrous components of finite staple length and essentially parallel orientation and a circumferential retaining element. In a fourth embodiment, the unitized filamentary construct of the present invention is formed from two or more reinforcing filamentary film and fibrous components of infinite length and essentially parallel orientation and a circumferential retaining element. The compositions of the reinforcing filamentary and/or fibrous components is selected from the group consisting of synthetic polymers, natural polymers, and the combinations thereof, and are not necessarily of the same polymeric composition, denier, finite staple length, or functionality. The circumferential retaining element describes a route about the combined two or more essentially parallel reinforcing components, thereby maintaining both the combination and essentially parallel orientation of the reinforcing filamentary film components. Once formed, the circumferential retaining element aids in maintaining the integrity of the unitized filamentary film construct, and the reinforcing filamentary components therein, for purposes of shipment, measurement, and dosing into a cementitious mixture. Preferably, the circumferential retaining element circumscribes no more than 80% of the total surface area of the unitized filamentary construct; more preferably circumscribes no more than 50% of the total surface area of the unitized filamentary construct; and most preferably circumscribes no more than 30% of the total surface area of the unitized filamentary construct, wherein the total surface area is defined as the overall length and circumference of the unitized filamentary construct. Limiting the circumferential retaining element serves to expose the significant and useful proportion oriented reinforcing filamentary film components within the unitized filamentary constructs to the external environment. Upon mechanical agitation of the unitized filamentary construct in a cementitious mixture, the circumferential retaining element is disrupted, allowing for the homogenous release, distribution and dispersement of the reinforcing filamentary component into the overall cementitious mixture.

The circumferential retaining element is selected from suitable materials, such as thermoplastic, thermoset and soluble resins, which are subject to mechanical failure when a corresponding stress and/or solvency threshold is exceeded. Various geometries may be employed in the application of the circumferential retaining element, including without limitation, continuous or discontinuous filaments, ribbons, or sheets, which circumscribe the combined, essentially parallel reinforcing fibrous components.

The circumferential retaining element may comprise one or more continuous or discontinuous filaments, ribbons, or sheets of varying thicknesses that retain the reinforcing fibrous components by a plurality of wrapping techniques so as to expose more or less fiber to the external environment. It is within the purview of the present invention that the composition of the circumferential retaining elements and of one or more of the reinforcing filamentary components need not necessarily be the same.

It should be noted that the reinforcing filamentary film components, as well as the resulting unitized filamentary constructs, can be treated with performance modifying additives, such as represented by the topical application of a material flow-enhancing lubricant. Further, temporary binding agents, including water-soluble chemistries such as polyvinyl alcohol, can be used in conjunction with the circumferential binding element.

Upon final formation of the unitized filamentary film constructs, the constructs can be readily packaged through an automatic packaging system or containerized in bulk. The latter packaging allows for a quantity of unitized filamentary constructs to being accurately and reproducibly augured, scooped or blended into a cementitious mixture at a mixing station, for example, through an automated gravimetric dispensing system.

Other features and advantages of the present invention will become readily apparent from the following detailed description, the accompanying drawings, and the appended claims.

DETAILED DESCRIPTION

While the present invention is susceptible of embodiment in various forms, hereinafter is described a presently preferred embodiment of the invention, with the understanding that the present disclosure is to be considered as an exemplification of the invention, and is not intended to limit the invention to the specific embodiment illustrated.

Filaments are routinely used as a reinforcement means in cementitious mixtures so as to render a corresponding cured cementitious construct incorporating such filaments more resistant to structural defect and failure. Due to difficulties encountered in the actual handling and homogenous incorporation of the finite staple length filaments experienced in preparing a cementitious mixture, the present invention is directed to a means for facilitating such preparation without the introduction of potentially problematic binding agents.

The filamentary components of the unitized construct of the present invention may be manufactured by directly extruding a polymeric sheet into a bath comprised of water so as to instantly quench the extruded film, slitting the film into ribbons, and chopping the film filaments into preselected widths. Optionally, the film filaments may be fibrillated, micro-fibrillated, or imparted with some texture to enhance adhesion of the cementitious mixtures to the filamentary components. Representative fibrillated films and manufacturing methods are disclosed in U.S. Pat. No. 3,595,454, 3,739,053, 3,756,484, and 3,301,252, all of which are hereby incorporated by reference. Further, the filamentary components may be manufactured in accordance with U.S. published patent application US20030044592A1, to Perez, et al., hereby incorporated by reference, wherein the filaments may be prepared by extruding a cast film of melt processible polymer, length orienting said cast film, slitting said oriented film into ribbons of preselected widths, and chopping said fibers to preselected lengths. If desired, the fibers may be shaped, or a pattern imparted to one or more surfaces. Further still, the filamentary components may be comprised of cut tapes. Examples of cut tapes are exemplified by U.S. Pat Nos. 6,569,525, and 6,569,526, both hereby incorporated by reference.

The dimensions of the unitized filamentary film construct is defined in terms of; the overall circumference, as based on the quantity and relative denier of the individual reinforcing filamentary film components, and of length, as based on the greatest length of the cumulative combination of reinforcing filamentary film components. Suitable overall circumferences and lengths of unitized filamentary film constructs formed in accordance with the present invention may reasonably range from 3 mm to 150 mm and from 8 mm to 100 mm, respectively. In a presently preferred embodiment for standard practices, unitized filamentary film constructs exhibit an overall diameter of between 3 mm and 30 mm and lengths of between 12 mm and 50 mm may be utilized.

A unitized filamentary construct which comprises a plurality of oriented reinforcing filamentary film components combined with a circumferential retaining element, is formed such that said circumferential retaining element provide temporary retention of the oriented reinforcing filamentary film components until such point the unitized filamentary film substrate is incorporated and subjected to mechanical agitation during preparation of a cementitious blend or mixture. The unitized filamentary film construct is endowed with inherent and improved dispensability and dispersability of the associated reinforcing filamentary film component into organic or inorganic cementitious matrixes, such as concrete, mortar, plaster, etc.

In a first embodiment, the unitized filamentary film construct of the present invention is formed from two or more reinforcing filamentary film components of finite staple length and essentially parallel orientation. The finite staple lengths of the filamentary components, in addition to the unitized filamentary film construct may have cross sections of varying shapes, such as round, square, oval, rectangular, etc. Further, the cross sections of the filamentary components and the unitized filamentary film construct may be of similar or dissimilar shapes. The present invention is not meant to be limited by the cross section shape of the filamentary components or the unitized filamentary film construct.

In a second embodiment, the unitized filamentary film construct of the present invention is formed from two or more reinforcing filamentary film components of infinite length and essentially parallel orientation, and a circumferential retaining element, wherein the composition of such filaments is selected from the group consisting of synthetic polymers, natural polymers, and the combinations thereof.

In a third embodiment, the unitized filamentary film construct of the present invention is formed from two or more reinforcing filamentary film and fibrous components of finite staple length and essentially parallel orientation and a circumferential retaining element, wherein the filamentary component and fibrous component lend to the enhancement of the cementitious mixture in either similar or dissimilar forms. For instance, the fibrous component may lend to the aesthetic appeal of the cementitious mixture, while the filamentary film component may lend to enhance the strength of the cementitious mixture.

In a fourth embodiment, the unitized filamentary construct of the present invention is formed from two or more reinforcing filamentary film and fibrous components of infinite length and essentially parallel orientation and a circumferential retaining element. The compositions of the reinforcing filamentary film and/or fibrous components is selected from the group consisting of synthetic polymers, natural polymers, and the combinations thereof, and are not necessarily of the same polymeric composition, denier, finite staple length, or functionality.

Preferably, the composition of the reinforcing filaments is selected from the synthetic polymers including, without limitation, thermoplastic and thermoset polymers. A particularly preferred embodiment of the present invention is directed to reinforcing filaments comprising polyolefin thermoplastic resins. It is within the purview of the present invention that the individual reinforcing filamentary film components as incorporated in the unitized filamentary film construct need not necessarily be of the same polymeric composition, denier, finite staple length, or functionality.

It is further within the purview of the present invention that either a portion of the reinforcing filamentary film components or all of the reinforcing filamentary film components may be placed under tension by means of twisting the reinforcing filamentary film components or by other means. Placing tension on some or all of the reinforcing filamentary film components causes the components to burst or pop upon mechanical agitation, which enhances the filament distribution within a cementitious mixture.

The unitized filamentary film construct further includes a circumferential retaining element. The circumferential retaining element describes a route about the combined two or more essentially parallel reinforcing filamentary film components, thereby maintaining both the combination and essentially parallel orientation of the reinforcing components. Once formed, the circumferential retaining element aids in maintaining the integrity of the unitized filamentary film construct, and the reinforcing component therein, for purposes of shipment, measurement, and dosing into a cementitious mixture. Upon mechanical agitation, and optionally exposure to appropriate solvents, of the unitized filamentary film construct in a cementitious mixture, the circumferential retaining element is disrupted, allowing for the homogenous release, distribution and dispersement of the reinforcing filamentary film component into the overall cementitious mixture.

The circumferential retaining element is selected from suitable materials, such as thermoplastic, thermoset and soluble resins, which are subject to mechanical failure when a corresponding stress and/or solvency threshold is exceeded. Optionally, the circumferential retaining element may comprise a chemical and/or mechanical interlocking means in addition to thermoplastic, thermoset and soluble resins or in place of the thermoplastic, thermoset and soluble resins. Various geometries may employed in the application of the circumferential retaining element, including without limitation, continuous or discontinuous filaments, ribbons, or sheets, which circumscribe the combined, essentially parallel reinforcing fibrous components. The circumferential retaining element may comprise one or more continuous or discontinuous filaments, ribbons, or sheets of varying thicknesses that retain the reinforcing filamentary film components by a plurality of wrapping techniques so as to expose more or less filament to the external environment.

It is within the purview of the present invention that the reinforcing filamentary film unitized construct comprise more than one retaining element, wherein a first retaining element circumscribes the overall unitized construct. The reinforcing filamentary film components can be retained by two circumferential retaining elements in a double helix wrapping technique, whereby two circumferential retaining elements crisscross back and forth about the circumference of the filamentary components. It is within the purview of the present invention that the composition of the circumferential retaining elements and of one or more of the reinforcing filamentary film components need not necessarily be the same. Preferably, the circumferential retaining element circumscribes no more than 80% of the total surface area of the unitized filamentary film construct; more preferably circumscribes no more than 50% of the total surface area of the unitized filamentary construct; and most preferably circumscribes no more than 30% of the total surface area of the unitized filamentary construct. Limiting the circumferential retaining element serves to expose the oriented reinforcing filamentary film components within the unitized filamentary constructs to the external environment. In addition, the exposure of the filamentary components allows for more effective disruption of the unified filamentary film construct when subjected to mechanical or solvent disruption.

In accordance with the present invention, the reinforcing filamentary film components may be of infinite length, wherein the reinforcing filamentary components are combined in an essentially parallel orientation, whereby one or more circumferential retaining elements circumscribes about the overall circumference of the continuous reinforcing filamentary film components. Such a formation allows the continuous unitized reinforcing filamentary film components to be available in a continuous form and packaged in a continuous lap or roll formation. Further, the continuous unitized reinforcing filamentary components are comprised of a series of segmented perforations or weakened points along the continuous formation so that the desired portion may be selected and detracted from the roll form.

It should be noted that the reinforcing filamentary film components, as well as the resulting unitized filamentary constructs, can be treated with performance modifying additives, such as represented by the topical application of a material flow-enhancing lubricant and temporary binding agents, such as water-soluble chemistries.

Upon final formation of the unitized filamentary film constructs, the constructs can be readily packaged through an automatic packaging system or containerized in bulk. The latter packaging allows for a defined quantity of unitized filamentary constructs to being accurately and reproducibly augured, scooped or blended into a cementitious mixture at mixing station, through an automated gravimetric dispensing system.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method of improving the properties of a cementitious mixture, wherein said method comprises the steps of:
   a) providing a cementitious mixture;
   b) providing unitized filamentary film constructs, each of said unitized filamentary film constructs having an overall length and circumference and being comprised of:
      i) two or more dispersible reinforcing filamentary film components comprising a polymeric composition and exhibiting a finite staple length, said filamentary film components optionally comprising fibrillated film;
      ii) one or more circumferential retaining elements;
      iii) wherein said reinforcing filamentary film components are combined in an essentially parallel orientation and said one or more circumferential retaining elements circumscribe about an overall circumference defined by said combined and essentially parallel reinforcing filamentary film components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption;
   c) adding into said cementitious mixture a quantity of unitized filamentary film constructs so as to form a cementitious mixture and unitized filamentary film construct blend; and
   d) mechanically agitating said cementitious mixture/unitized filamentary film construct blend so as to disrupt said circumferential retaining elements and disperse said reinforcing filamentary film components into said cementitious mixture.

2. A method as in claim 1, wherein said unitized filamentary film constructs exhibit an overall circumference of between about 3 mm to 150 mm.

3. A method as in claim 2, wherein said unitized filamentary film constructs exhibit an overall circumference of between about 3 mm to 30 mm.

4. A method as in claim 1, wherein said unitized filamentary film constructs exhibit a length of between about 8 mm to 100 mm.

5. A method as in claim 4, wherein said unitized filamentary film constructs exhibit a length of between about 12 mm to 50 mm.

6. A method as in claim 1, wherein a portion or all of said reinforcing filamentary film components are placed under tension.

7. A method of improving the properties of a cementitious mixture, wherein said method comprises the steps of:
   a) providing a cementitious mixture;
   b) providing unitized filamentary film constructs, each of said unitized filamentary film constructs having an overall length and circumference and being comprised of:
      i) two or more dispersible reinforcing filamentary film components comprising a polymeric composition and exhibiting an infinite length, said filamentary film components optionally comprising fibrillated film;
      ii) one or more circumferential retaining elements;
      iii) wherein said reinforcing filamentary film components are combined in an essentially parallel orientation and said one or more circumferential retaining elements circumscribe about an overall circumference defined by said combined and essentially parallel reinforcing filamentary film components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption;
   c) adding into said cementitious mixture a quantity of unitized filamentary film constructs so as to form a cementitious mixture and unitized filamentary film construct blend; and
   d) mechanically agitating said cementitious mixture/unitized filamentary film construct blend so as to disrupt said circumferential retaining elements and disperse said reinforcing filamentary film components into said cementitious mixture.

8. A method as in claim 7, wherein said unitized fibrous constructs comprise perforated segments.

9. A cementitious reinforcement comprising unitized filamentary film constructs, each of said unitized fibrous constructs having an overall length and circumference and being comprised of two or more dispersible reinforcing filamentary film components comprising a polymeric composition and exhibiting a finite staple length and one or more circumferential retaining elements, said filamentary film components optionally comprising fibrillated films, wherein said reinforcing filamentary film components are combined in an essentially parallel orientation and said one or more circumferential retaining elements circumscribe about an overall circumference defined by said combined and essentially parallel reinforcing filamentary film components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption.

10. A cementitious reinforcement comprising unitized filamentary film constructs, each of said unitized filamentary film constructs having an overall length and circumference and being comprised of two or more dispersible reinforcing filamentary film components comprising a polymeric composition and exhibiting a infinite length and one or more circumferential retaining elements, wherein said reinforcing filamentary film components are combined in an essentially parallel orientation and said one or more circumferential retaining elements circumscribe about an overall circumference defined by said combined and essentially parallel reinforcing-filamentary film components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption.

11. A method of improving the properties of a cementitious mixture, wherein said method comprises the steps of:
a) providing a cementitious mixture;
b) providing unitized filamentary film and fibrous constructs, each of said unitized filamentary film and fibrous constructs having an overall length and circumference and being comprised of:
i) two or more dispersible reinforcing filamentary film and fibrous components comprising a polymeric composition and exhibiting a finite staple length, said filamentary film components optionally comprising fibrillated film;
ii) one or more circumferential retaining elements;
iii) wherein said reinforcing filamentary film and fibrous components are combined in an essentially parallel orientation and said one or more circumferential retaining elements circumscribe about an overall circumference defined by said combined and essentially parallel reinforcing filamentary film and fibrous components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption;
c) adding into said cementitious mixture a quantity of unitized filamentary film and fibrous constructs so as to form a cementitious mixture and unitized filamentary film and fibrous construct blend; and
d) mechanically agitating said cementitious mixture/unitized filamentary film and fibrous construct blend so as to disrupt said circumferential retaining elements and disperse said reinforcing filamentary film and fibrous components into said cementitious mixture.

12. A method of improving the properties of a cementitious mixture, wherein said method comprises the steps of:
a) providing a cementitious mixture;
b) providing unitized filamentary film and fibrous constructs, each of said unitized filamentary film and fibrous constructs having an overall length and circumference and being comprised of:
i) two or more dispersible reinforcing filamentary film and fibrous components comprising a polymeric composition and exhibiting an infinite length, said filamentary film components optionally comprising fibrillated film;
ii) one or more circumferential retaining elements;
iii) wherein said reinforcing filamentary film and fibrous components are combined in an essentially parallel orientation and said one or more circumferential retaining elements circumscribe about an overall circumference defined by said combined and essentially parallel reinforcing filamentary film and fibrous components, wherein each said unitized filamentary film constructs has a total surface area based on the overall length and circumference of said construct, and said one or more circumferential retaining elements circumscribe no more than 80% of the total surface area of each construct to expose the reinforcing filamentary film components for more effective disruption when subjected to mechanical disruption;
c) adding into said cementitious mixture a quantity of unitized filamentary film and fibrous constructs so as to form a cementitious mixture and unitized filamentary film and fibrous construct blend; and
d) mechanically agitating said cementitious mixture/unitized filamentary film and fibrous construct blend so as to disrupt said circumferential retaining elements and disperse said reinforcing filamentary film and fibrous components into said cementitious mixture.

13. A method as in claim 1, wherein no more than 50% of the total surface area of said unitized fibrous constructs being circumscribed by circumferential retaining elements.

14. A method as in claim 1, wherein no more than 30% of the total surface area of said unitized fibrous constructs being circumscribed by circumferential retaining elements.

15. A method as in claim 1, wherein said circumferential retaining elements are selected from the group consisting of filaments and ribbons.

16. A method as in claim 1, where said reinforcing film components comprise ribbons slit from extruded, oriented polymeric film and chopped to said finite staple length.

17. A cementitious reinforcement as in claim 9, wherein no more than 50% of the total surface area of said unitized fibrous constructs being circumscribed by circumferential retaining elements.

18. A cementitious reinforcement as in claim 9, wherein no more than 30% of the total surface area of said unitized fibrous constructs being circumscribed by circumferential retaining elements.

19. A cementitious reinforcement as in claim 9, wherein said circumferential retaining elements are selected from the group consisting of filaments and ribbons.

20. A cementitious reinforcement as in claim 9, where said reinforcing film components comprise ribbons slit from extruded, oriented polymeric film and chopped to said finite staple length.

* * * * *